July 21, 1959 — E. JONES — 2,895,497
PACKLESS VALVE
Filed April 18, 1956 — 2 Sheets-Sheet 1

INVENTOR.
Evan Jones,
BY Cromwell, Greist & Warden
Attys.

July 21, 1959

E. JONES 2,895,497

PACKLESS VALVE

Filed April 18, 1956

INVENTOR.
Evan Jones,
BY
Cromwell, Greist + Warden
Attys.

United States Patent Office 2,895,497
Patented July 21, 1959

2,895,497

PACKLESS VALVE

Evan Jones, Evanston, Ill., assignor to Henry Valve Company, Incorporated, Melrose Park, Ill., a corporation of Illinois Application April 18, 1956, Serial No. 579,098

2 Claims. (Cl. 137—316)

The present invention relates generally to an improved form of packless valve utilizing a flow-restricting flexible diaphragm urged into and out of engagement with a valve seat. More specifically, the present invention is directed to an improved packless valve of the flexible diaphragm type which is capable of increased efficiency and functioning due to the structural features and arrangement of elements associated with the diaphragm, some of which cooperate with the same to urge the diaphragm into and out of flow-restricting engagement with a valve seat.

It is an object of the present invention to provide an improved packless valve of uncomplicated design and arrangement of elements, the valve being readily and easily assembled exhibits an increased capacity as a result of the novel arrangement of cooperating elements without an accompanying increase in manufacturing or maintenance cost.

Another object is to provide an improved packless valve which utilizes a flexible diaphragm having associated therewith elements capable of moving the same into and out of engagement with a valve seat to control the flow of fluid through the valve, the valve seat being located within a valve flow chamber of substantial volumetric capacity, the diaphragm being movable away from the valve seat upon the opening of the valve by means of a coiled spring positioned within the flow chamber and arranged with respect to the flow of fluid therethrough without interfering with the same while at the same time being associated with the diaphragm to provide for efficient functioning of the same.

A further object is to provide an improved packless valve utilizing efficiently functioning cooperative elements associated with the valve stem and diaphragm to move the latter into engagement with the valve seat, these elements forming an uncomplicated arrangement of low cost and long life and including a back-seating arrangement of improved design which materially adds to the efficient functioning of the valve.

Other objects not specifically set forth will become apparent from the following detailed description made in conjunction with the drawings wherein.

Packless valves of the type to be described are adapted for a variety of uses and have been considered desirable primarily from the standpoint of low cost manufacture, generally efficient operation and low cost maintenance. Valves of this nature are used in refrigerant-charging boards, high vacuum service, and operation with fluids such as liquefied petroleum gases, oil, compressed air, water, steam, gasoline, etc. The diaphragm-type valve provides leak-proof features which makes it particularly desirable not only for refrigeration and air-conditioning systems but also for use with fluids where leaks would prove dangerous or costly. The diaphragm carried by the valve is moved into and out of flow-restricting engagement with the valve seat and serves as a seal by reason of its association with the movable parts of the valve, the present invention being directed particularly toward improvements made in the design and arrangement of the elements associated with the diaphragm to improve the operation of the valve while at the same time maintaining the initial cost of the same at a minimum.

Figure 1:
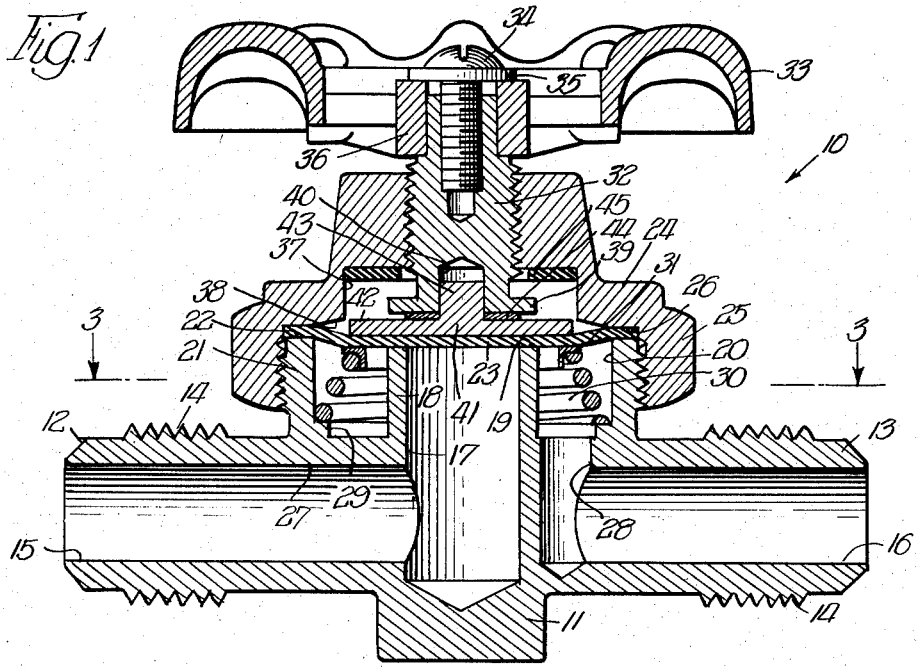
Fig. 1 is a vertical section of the improved packless valve of the present invention illustrating the valve in closed condition.
Figure 2:
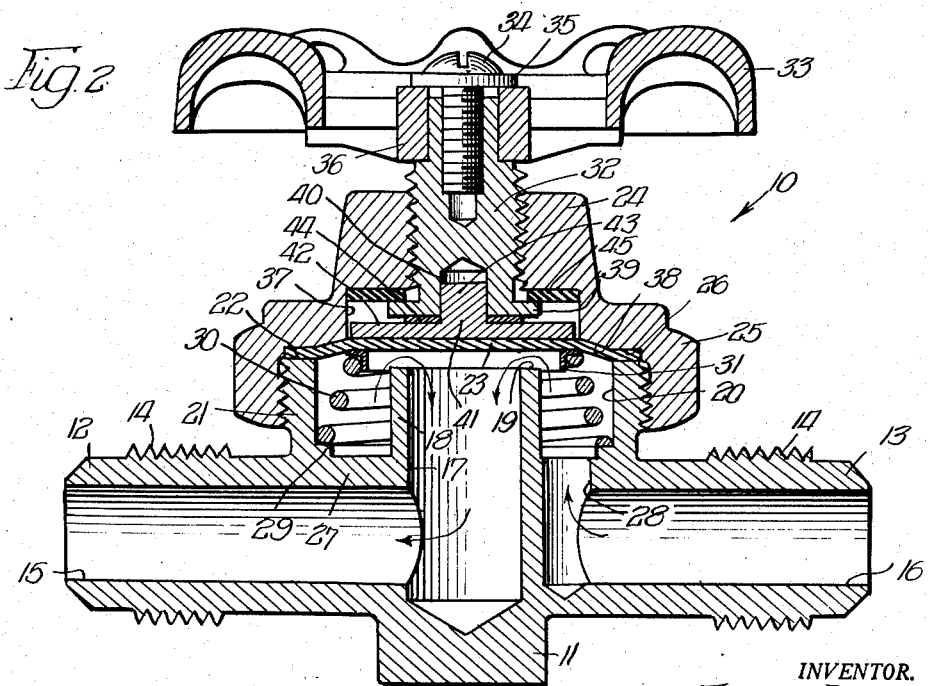
Fig. 2 is a view similar to Fig. 1 illustrating the valve in open condition.

In Figs. 1 and 2 the valve 10 is illustrated as including a valve body 11 provided with oppositely directed integral nipples 12 and 13 having external threads 14 and which define fluid passageways 15 and 16 respectively. The passageway 15 communicates with a vertically extending passageway 17 near the bottom thereof, this passageway being defined by an annular wall 18, the top radial edge of which defines a valve seat 19. The annular wall 18 extends upwardly toward the top of the valve body 11 a substantial distance into a valve chamber 20 defined by an annular outer wall 21 symmetrically located about the inner annular wall 18 and integrally formed with the nipples 12 and 13.

The top radial edge of the outer wall 21 defines a diaphragm seat 22 for a diaphragm 23 of large diameter formed from flexible material. The diaphragm 23 is preferably formed from flexible plastic material such as Teflon, which is a tetrafluoroethylene polymer manufactured by E. I. du Pont de Nemours and Company of Wilmington, Delaware, as such material exhibits wear-resistant properties and the requisite flexibility for use in the valve of the type described. The peripheral edge of the diaphragm 23 is clamped against the radial edge 22 by a valve bonnet or cap 24 provided with an axially extending annular bottom or end wall 25, the innermost end of which is defined by an inwardly directed radial shoulder 26 which engages the top surface of the peripheral edge of the diaphragm 23 to seal the same with respect to the radial edge 22. The inner surface of the annular wall 25 is threadedly received about the outer annular wall 21 to removably retain the valve cap 24 on the valve body 11.

Figure 3:
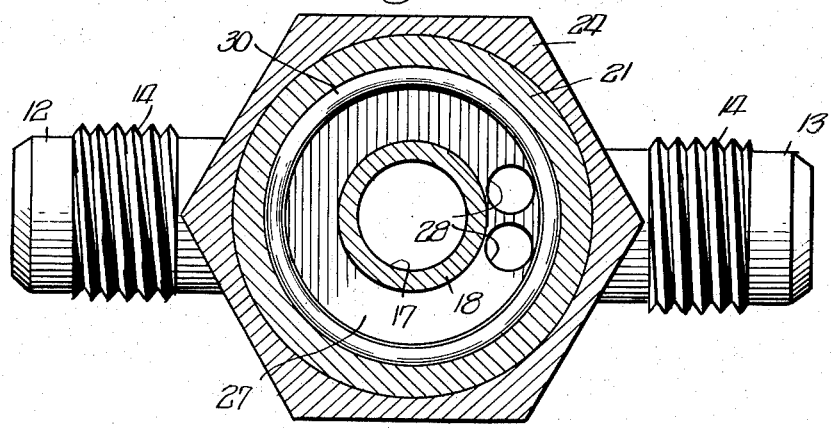
Fig. 3 is a view taken generally along line 3—3 of Fig. 1 illustrating the arrangement of elements in the body portion of the valve.
Figure 4:
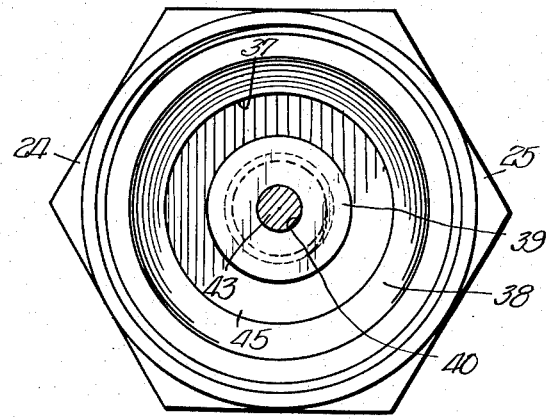
Fig. 4 is a bottom plan view of the cap of the valve having the diaphragm and bearing plate removed to further illustrate the back-seating arrangement.
Figure 5:
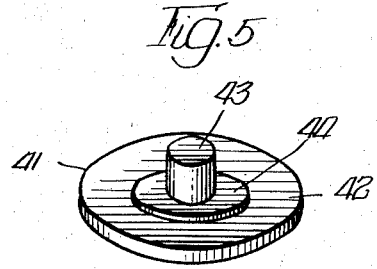
Fig. 5 is a perspective of the diaphragm bearing plate forming a part of the valve.

The bottom surface of the valve chamber 20 is defined by a radially directed wall 27 which, as particularly shown in Fig. 3, is provided with a pair of vertically drilled openings 28 communicating the valve chamber 20 with the passageway 16. The outer peripheral edge of the bottom wall 27 is provided with an upstanding annular shoulder 29 which is circumferentially continuous and the top radial surface of the shoulder 29 forms a bottom seat for a coil spring 30. The spring 30 is cone-shaped having its base mounted on the shoulder 29 and completely carried to one side of the openings 28 out of flow-restricting relation therewith. The top portion of the cone-shaped spring 30 is truncated and carries a retainer ring 31 of generally L-shaped cross section having a flat top surface in engagement with the bottom surface of the diaphragm 23. The spring retainer 31 prevents damage to the diaphragm 23 by the action of the spring 30 urging the same out of engagement with the valve seat 19. The diameter of the base of the spring 30 is slightly less than the inner diameter of the valve chamber 20 to center the spring therein in supported engagement with the shoulder 29 and thereby maintain the spring out of flow-restricting relation with the openings 28 and the vertical passageway 17.

The valve cap 24 carries a threadedly received, vertically directed valve stem 32 which is connected at its upper end to a handwheel 33 by a screw 34 inserted through a washer 35. The handwheel 33 is provided with a flat-sided socket 36 which receives the top end of the stem 32 therein and prevents relative movement between the handwheel and stem. The bottom portion of the stem 32 is received within an axially and downwardly opening annular recess 37, the lowermost end of which is defined by a radially outwardly and downwardly inclined annular shoulder 38 which joins the diaphragm retaining surface 26 interiorly of the outer wall 25. The bottom surface of the stem 32 is provided with a radially directed annular flange or shoulder 39 and is centrally apertured in an inwardly direction to define a bearing plate mounting bore 40. A bearing plate 41 formed from a radially extending disk portion 42 and an integral upstanding centrally located stud 43 is movably mounted between the end of the stem 32 and the diaphragm 23. The stud 43 is received within the bore 40 and is relatively movable therein being loosely received to an extent that the bore 40 does not frictionally retain the bearing plate 41 in association with the stem 32. Intermediate the opposed surfaces of the stem 32 and bearing plate 41 is positioned a washer 44 received about the stud 43. As the bearing plate 49 is not frictionally held by the bore 40 of the stem 32, this element in effect rests on the top surface of the diaphragm 23 and is constantly in engagement with the same during the operation of the valve.

Upon advancing of the valve stem 32 toward the valve seat 19 by turning the handwheel 33, the radial annular shoulder 39 rotates relative to the bearing plate 41 and moves the same and the diaphragm 23 toward and into engagement with the valve seat 19 as shown in Fig. 1. The valve 10 is then in its closed position and the spring 30 is compressed against the downward movement of the valve stem 32. In opening the valve 10, as shown in Fig. 2, the valve stem 32 is retracted and rotates relative to the bearing plate 41. Upon retraction of the valve stem 32, the spring 30 moves the diaphragm 23 upwardly out of engagement with the valve seat 19 and fluid flow through the valve is established as indicated by the arrows.

Due to the biasing action of the spring 30, the diaphragm 23 is maintained in engagement with the bearing plate 41 at all times and the bearing plate 41 is constantly urged upwardly against the bottom of the valve stem 32 thereby maintaining it in its operative position with respect to the valve stem 32 and diaphragm 23. The diaphragm is moved upwardly away from the valve seat 19 until the top surface of the annular shoulder 39 abuts a relatively soft back-seat washer 45 retained in engagement with the rear radial face of the recess 37 and surrounding the valve stem 32. Contact between these elements restricts further upward movement or retraction of the stem 32 and at this point the peripheral portion of the diaphragm 23 immediately outwardly of the peripheral edge of the bearing plate 41 contacts the inclined radial shoulder 38 of the valve cap 24. The inclined radial shoulder 38 is provided to prevent damage to the diaphragm 23 by contact with sharp edges or corners in its fully retracted position.

The back-seating arrangement including engagement between the radial shoulder 39 and washer 45 not only serves to limit movement of the diaphragm 23 away from the valve seat 19 but further provides a soft cushioning effect when the valve stem 32 is in its fully retracted position thereby preventing freezing of the valve stem in this position and allowing easy operation of the handwheel 33 to ultimately move the diaphragm 23 back into engagement with the valve seat 19 to close the valve 10. Still further, the diameter of the diaphragm 23 is such that it is closely received within the annular wall 25 and substantially retained therein by the threads extending along the inner surface of the wall 25 to be capable of holding the bearing plate 41 in its operatively mounted position with respect to the valve stem 32 upon removal of the cap 24 from the valve body 11. Thus, while the bearing plate 41 is not frictionally retained by the bore 40 and would drop away from the stem 32 upon removal of the diaphragm 23 from the cap 24, the diaphragm 23 is arranged to hold the bearing plate in its operative position upon removal of the cap 24. This is an important feature from the standpoint of maintenance as the cap 24, including the elements carried thereby, may be quickly removed and replaced without the necessity of carefully holding the bearing plate in its operative position with respect to the stem 32.

The extending of the inner annular wall 18 upwardly from the bottom of the valve chamber 20 to a point that the valve seat 19 is almost coplanar with the top radial edge 22 of the outer wall 21 provides a valve chamber 20 of substantial volumetric capacity to insure full flow capacity of the valve 10 when the same is opened. The shape and manner of mounting the spring 30 in the valve chamber 20 eliminates interference by the spring 30 with fluid flow through the openings 28 and the large capacity of the valve chamber 20 provides a constant supply of fluid for flow between the diaphragm 23 and valve seat 19. Consequently, the arrangement of the elements associated with the valve chamber 20 is such that unimpeded flow of fluid is provided and the only limitation of volumetric capacity of the valve 10 resides in the extent to which the movement of the diaphragm 23 away from the valve seat 19 is limited.

From the foregoing description it may be readily seen that the packless valve of the present invention is capable of efficient, large capacity operation, and in order to obtain this the functional elements of the valve have not been overcomplicated in design, number or functional relation. The valve 10 is simply constructed and readily adapted for low cost mass production. The back-seating arrangement additionally serves as a safety feature in the event that the diaphragm should become ruptured during operation. By retracting the stem 32 to its fullest extent the back-seating of the flange 39 on the washer 45 seals the valve 10 against external leakage of fluid flowing therethrough. While the direction of flow of fluid has been indicated in Fig. 2 by the arrows, it should be readily apparent that the valve 10 is non-directional in operation and the flow of fluid in either direction through the valve results in the same efficient operation of the valve. Still further, the arrangement allows the use of a large diameter diaphragm which provides the requisite flexibility while resulting in less fatigue.

Obviously many modifications and variations of the invention as hereinbefore set forth may be made without departing from the spirit and scope thereof, and therefore only such limitations should be imposed as are indicated in the appended claims.

I claim:

1. A packless valve including a body portion having vertically extending inner and outer spaced annular walls, the top radial edge of said inner wall defining a valve seat which is positioned slightly below the top radial edge of said outer wall, said walls being of substantial axial length and defining therebetween a valve chamber of substantial size having a bottom annular wall connecting said inner and outer walls, a readily flexible diaphragm peripherally clamped between the top radial edge of said outer wall and an inner radial surface of a cap removably secured to said body portion, the outer peripheral portion of said bottom wall having a raised annular shoulder on which rests the base of an upwardly directed cone-shaped coil spring, the top of said spring being truncated and in operative engagement with the inner surface of said diaphragm and acting to urge the same out of contact with said valve seat, a movable stem received through said cap and having a bearing plate in engagement with the outer surface of said diaphragm to cooperatively move said diaphragm with said spring into and out of flow restricting relation with said seat, said bearing plate being engaged by said stem for rotation therewith while being readily axially disengaged therefrom, separate passageways in said body portion communicating said chamber with the exterior of said body portion through said valve seat and the bottom wall of said chamber, the latter passageway extending through said bottom wall between said inner wall and said shoulder and providing unrestricted flow into said chamber toward and away from said valve seat, said spring being positioned within said chamber out of flow restricting relation with respect to said latter passageway, said cap being provided with an annular end wall received about the outer wall of said body portion, an annular radial shoulder inwardly of the outermost edge of said end wall defining the diaphragm clamping inner radial surface, said diaphragm being snugly received by said end wall and retained thereby when said cap is removed from said body portion, said diaphragm retaining said bearing plate in mounted association with said stem upon removal of said cap from said body portion.

2. The valve of claim 1 wherein said bearing plate is positioned within an axially opening recess in said cap and is in the form of an annular disk having an axially extending stud removably received in an axial bore extending inwardly from the bottom surface of said stem, said bottom surface being defined by an annular radial flange, the inner radial surface of said recess defining the upper extent of the same carrying a washer forming a relatively soft back seat for said flange upon retraction of said stem.

References Cited in the file of this patent

UNITED STATES PATENTS

| | | |
|---|---|---|
| 1,069,067 | Huxford | July 29, 1913 |
| 1,494,910 | Hench | May 20, 1924 |
| 2,323,531 | Franck | July 6, 1943 |
| 2,679,378 | Uhler | May 25, 1954 |
| 2,701,118 | Uhler | Feb. 1, 1955 |

FOREIGN PATENTS

| | | |
|---|---|---|
| 1,096,003 | France | of 1954 |
| 1,097,893 | France | of 1955 |